United States Patent [19]
Jackson

[11] Patent Number: 5,301,533
[45] Date of Patent: Apr. 12, 1994

[54] CAM OPERATED PIERCE APPARATUS

[76] Inventor: Donald T. Jackson, 1159 Ashley, Troy, Mich. 48098

[21] Appl. No.: 918,266

[22] Filed: Jul. 23, 1992

Related U.S. Application Data

[63] Continuation-in-part of Ser. No. 784,381, Oct. 29, 1991, abandoned, which is a continuation of Ser. No. 730,582, Jul. 15, 1991, Pat. No. 5,085,480, which is a continuation of Ser. No. 506,671, Apr. 9, 1990, abandoned.

[51] Int. Cl.[5] .............................................. B21D 28/20
[52] U.S. Cl. .................................... 72/328; 72/407; 72/452; 72/453.01; 74/107; 83/143; 83/601
[58] Field of Search ................. 83/600, 601, 604, 140, 83/143, 623; 74/104, 107; 269/239, 233, 32, 34; 72/452, 453.16, 407, 453.01, 328

[56] References Cited

U.S. PATENT DOCUMENTS

| Re. 18,260 | 11/1931 | Messmer | 83/143 |
|---|---|---|---|
| Re. 31,991 | 9/1985 | Descoteaux et al. | 294/88 |
| 770,270 | 9/1904 | Dehn . | |
| 1,739,152 | 12/1929 | Larsen . | |
| 2,364,239 | 12/1944 | Parks | 90/60 |
| 2,378,570 | 6/1945 | Mitchell | 294/110 |
| 2,641,806 | 6/1953 | Leckrone | 22/95 |
| 2,850,926 | 9/1958 | Jobe | 77/63 |
| 3,084,893 | 4/1963 | Ruth | 248/228 |
| 3,170,322 | 2/1965 | Cavanaugh | 73/103 |
| 3,371,953 | 3/1968 | Blatt | 294/88 |
| 3,415,101 | 12/1968 | Reincke | 72/452 |
| 3,482,830 | 12/1969 | Sendoykas | 74/107 |
| 3,635,414 | 1/1972 | Blatt | 294/106 |
| 3,714,870 | 2/1973 | Blatt | 92/140 |
| 3,764,023 | 10/1973 | Jatcko | 214/1 BC |
| 3,767,063 | 10/1973 | McKinven, Jr. | 214/1 BB |
| 4,043,011 | 8/1977 | Giraudi et al. | 29/33.5 |
| 4,234,223 | 11/1980 | O'Neil | 294/88 |
| 4,294,444 | 10/1981 | Horton | 269/156 |
| 4,368,913 | 1/1983 | Brockmann et al. | 294/106 |
| 4,518,187 | 5/1985 | Blatt et al. | 294/88 |
| 4,571,975 | 2/1986 | Pawloski | 72/452 |
| 4,596,415 | 6/1986 | Blatt | 294/88 |
| 4,706,489 | 11/1987 | Dacey, Jr. | 72/450 |
| 4,811,935 | 3/1989 | Tamura et al. | 269/34 |
| 4,887,612 | 12/1989 | Esser et al. | 128/751 |
| 5,085,480 | 2/1992 | Jackson | 294/116 |
| 5,125,307 | 6/1992 | Jackson | 83/601 |

FOREIGN PATENT DOCUMENTS

| 609476 | 11/1960 | Canada | 83/600 |
|---|---|---|---|
| 2418271 | 1/1976 | Fed. Rep. of Germany | 72/452 |
| 215739 | 11/1984 | Fed. Rep. of Germany . | |
| 1180806 | 6/1959 | France . | |
| 2223543 | 10/1974 | France . | |
| 421712 | 4/1967 | Switzerland | 72/452 |
| 776863 | 11/1980 | U.S.S.R. . | |
| 848353 | 4/1981 | U.S.S.R. . | |
| 996644 | 8/1964 | United Kingdom . | |

Primary Examiner—Daniel C. Crane
Attorney, Agent, or Firm—Basile and Hanlon

[57] ABSTRACT

A workpiece engaging apparatus includes a drive having a linearly reciprocal drive member. Two pairs of arms are arranged in opposed, inverted relationship with respect to each other and are pivotally connected at one end to the drive. Each arm has a cam formed therein. The cams in each of the pairs of arms are identically constructed, but the cams in one pair are disposed in opposed, inverted relationship with respect to the cams in the opposed pair of arms. Cam follower members mounted on the linear drive member engage the cams during reciprocal movement of the drive member to pivot the pairs of arms between an open, spaced-apart position and a closed workpiece engaging position. Each of the cams includes a first arcuate shaped first end portion which smoothly merges into a substantially linear second end portion. The arcuate shaped first end portion is disposed at a generally obtuse angle with respect to the pivot pin connecting each of the pairs of arms to the drive to provide smooth, non-locking pivotal movement of the arms as the linear drive member moves from the first end of the cams.

4 Claims, 14 Drawing Sheets

CAM OPERATED PIERCE APPARATUS

CROSS REFERENCE TO CO-PENDING APPLICATION

This application is a continuation-in-part of co-pending U.S. patent application Ser. No. 07/784,381, filed on Oct.29, 1991 in the name of Donald T. Jackson and entitled "Cam Operated Workpiece Engaging Apparatus" now abandoned, which is a continuation of U.S. patent application Ser. No. 07/730,582, filed Jul. 15, 1991, now U.S. Pat. No. 5,085,480, issued Feb. 4, 1992, which is a continuation of U.S. patent application Ser. No. 7/506,671, filed Apr. 9, 1990, now abandoned.

BACKGROUND OF THE INVENTION

1. Field of the Invention

The present invention relates to workpiece engaging tools used in manufacturing operations and, specifically, to gripping, clamping, piercing and hemming devices for engaging and/or performing work on workpieces.

2. State of the Art

In manufacturing operations, various types of tools are employed to engage workpieces and/or to perform work on such workpieces. Typically, grippers and clamps are used to engage workpieces at the completion of one manufacturing operation and to remove such workpieces from one work station for subsequent transport to another work station or to a storage location.

In a typical stamping operation in which metal sheets are progressively formed to a final shape through a series of work operations in adjacently disposed stamping presses, grippers are employed to remove the metal sheet from each press and, in combination with additional parts handling equipment, to deposit the workpiece in an adjacent press or an intermediate idle station located between adjacent presses.

Typically, such grippers are formed of a number of interconnected pins and links which effect opening and closing of gripper jaws. Such mechanisms are complicated in construction and high in cost. Further, the pins and links of such grippers are employed to drive the gripper jaws into a position engaging the workpiece. This provides an inefficient and variable force to grip such workpieces.

In hemming applications, such as the manufacture of vehicle doors, deck lids, etc., the edge of one sheet of metal is bent around the edge of an upper disposed sheet to join the two sheets of metal together Typically, a complex and elaborate machine is employed to bend the edge of the lower sheet about the upper sheet. Such machines utilize a complex arrangement of fluid cylinders and links to effect the bending of the metal sheet edge.

In piercing operations, a punch is brought under high force into engagement with a workpiece, typically in the form of one or more metal sheets. The workpiece or metal sheets are supported on a die which has a through bore extending therethrough. The punch is forced through the workpiece or sheet metal into the bore in the die to form an aperture in the workpiece.

In a previous pierce apparatus devised by the Applicant, a pierce unit was constructed utilizing two pairs of opposed upper and lower arms pivotally mounted to a housing. A drive pin mounted on the end of an extensible, fluid operated, cylinder piston rod extended through a pair of central guide plates having linear cams formed therein to guide the drive pin in a linear path. The drive pin also engaged cams formed in each of the upper and lower arms, FIG. 10, to pivot the arms between a spaced-apart open position and a closed, workpiece engaging position. A punch or pierce unit was mounted on the upper arms and a die was mounted on the lower arms.

The cams in each of the upper and lower arms had a generally open L-shape with the two substantially linear portions of each cam being disposed at an interior obtuse angle with respect to each other. While this cam shape effectively moved the arms between open and closed positions during movement of the drive pin therealong and generated sufficient force to drive the punch through the workpiece, a problem occurred when the arms were moved to the full open position by retraction of the piston rod and drive pin attached thereto. When the drive pin reached the extreme end, the leftmost end in FIG. 1, the drive pin was directly in line with the pivot pin connecting the pivotal arms to the surrounding guide housing. The cam through which the drive pin was to be urged during subsequent extension of the drive pin and cylinder piston rod was thus disposed at a substantially 90° angle with respect to a line extending between the drive pin and the pivot pin. This resulted in frequent locking of the pivotal arms in the open position and, even if the drive pin was able to be driven from the end of the cam, a non-smooth operation of the pierce unit resulted.

Thus, it would be desirable to provide a workpiece engaging apparatus for manufacturing operations which has a high workpiece engaging force and, yet, is simple in design. It would also be desirable to provide a workpiece engaging apparatus for manufacturing operations which overcomes the problems encountered with previously devised pierce apparatus. It would also be desirable to provide a workpiece engaging apparatus particularly suited for piercing applications which has a smooth, non-locking operation.

SUMMARY OF THE INVENTION

The present invention is an apparatus for engaging workpieces which includes a linear drive means having a reciprocally extendable and retractable drive member. First and second workpiece engaging means, each having first and second ends, are arranged in opposed, inverted positions with respect to each other and pivotally connected together at the first ends to the linear drive member. First and second cam means are formed in the first and second workpiece engaging means, respectively. The first and second cam means are disposed in opposed relationship with respect to each other.

Cam follower means are mounted on the linear drive member and engage the first and second cam means in the first and second workpiece engaging means to pivot the first and second workpiece engaging means between first and second positions as the drive member reciprocates. First and second workpiece engaging surfaces are respectively formed on the second ends of the first and second workpiece engaging means for engaging a workpiece when the first and second workpiece engaging means are pivoted to the second position.

In one embodiment, the cam means comprises first and second, identical cams which are formed in each of the first and second workpiece engaging means. Each of the cams is formed with a first linear portion which is disposed at an inclined angle with respect to the linear motion axis of the linear drive member and a second, contiguous end portion disposed at a predetermined angle with respect to the first linear portion.

The cam follower means preferably comprises a pin mounted on the linear drive member. First and second ends of the pin extend outward from the linear drive member. Pairs of cam follower members are mounted on each of the first and second ends of the pin to engage one of the cams in the first and second workpiece engaging means.

In a preferred embodiment, the linear drive means comprises a fluid operated cylinder having a reciprocal cylinder rod. A support member is mounted on the cylinder and forms an attachment surface for pivotally receiving the first ends of the first and second workpiece engaging means.

In another embodiment, the workpiece engaging apparatus comprises a linear drive means having a reciprocal drive member. Guide means for guiding the linear movement of the drive member is pivotally mounted to one end to the linear drive means. A first cam means is formed in the guide means. A cam follower means is mounted on the drive member and engages the first cam means in the guide means to control the linear movement of the drive member.

In this embodiment, a workpiece engaging means is pivotally connected to the linear drive means at one end. The workpiece engaging means includes a workpiece engaging portion at a second, opposed end. Second cam means are formed in the workpiece engaging means and engaged by the cam follower means. The second cam means has a predetermined shape to pivot the workpiece engaging means from an open position in which the workpiece engaging portion is spaced from a workpiece and an operative position in which the workpiece engaging portion engages a workpiece as the cam follower means extends with movement of the drive member along the length of the second cam means.

In this embodiment, the first cam means preferably has a straight, linear configuration between its ends. The second cam means in the workpiece engaging means has an arcuate shape, preferably curving at a constant radius, to pivot the workpiece engaging means between the open and workpiece engaging positions.

This latter embodiment of the workpiece engaging apparatus of the present invention is ideally suited for hemming applications in which the edge of a lower metal sheet is bent around the edge of an upper disposed metal sheet. This apparatus is simple in construction and is capable of generating the necessary force to effect the hemming operation.

In another embodiment, more particularly suited for piercing applications, the workpiece engaging apparatus of the present invention also includes a linear drive means having a reciprocal drive member. Guide means are provided for guiding the linear movement of the drive member. The guide means is devised for mounting to a support structure, such as a programmable robot, automatic tool, stationary stand, etc. First and second, oppositely movable arms, each including a pair of spaced, identically constructed, parallel disposed arms, are pivotally connected together at one end to the guide means. Each of the first and second pairs of arms has a cam formed therein, with the cams in the first and second pairs of arms being substantially identical. The cams in the first pair of arms are disposed in an opposite, inverted position with respect to the cams in the second pair of arms. The cams in the first and second pairs of arms are engaged by the linear drive means so as to move the first and second arms between a spaced-apart, open position and a closed, workpiece engaging position upon extension and retraction of the drive means.

In a preferred embodiment, the cam in each of the first and second pairs of arms includes at least two sections. The first section has a smoothly curved, arcuate form extending from a first end of each cam which merges smoothly with the second section of each cam which has a generally linear form extending to the second end of each cam. The first section of each cam adjacent the first end of each cam extends arcuately from the pivot pin connecting the arms to the guide housing so as to enable the linear drive means, when disposed in the first end of each cam, to smoothly pivot the first and second pairs of arms from the open position to the closed position upon extension of the linear drive means, without locking of the first and second pairs of arms in the open position.

A pierce means including at least one pierce or punch is mounted on the second end of the first pair of arms. A complimentarily shaped die means is mounted on the second end of the second pair of arms, with the workpiece being disposed between the pierce means and the die means when the first and second pair of arms are moved to the closed position.

A stripper plate is biasingly mounted to the first pair of pivotal arms, with the pierce means, such as one or more punches, slidably extending therethrough. The stripper means which is in the form of a plate which engages the workpiece and strips the workpiece from the pierce means as the pierce means is retracted from the workpiece during the opening of the first and second pivotal arms after the completion of a piercing operation.

The apparatus of each embodiment of the present invention is simple in construction and, yet, provides an infinite force or pressure for securely engaging a workpiece. The apparatus can be advantageously employed in gripping applications where workpieces are removed from one work station and transported to an adjacent work station or to an intermediate, idle station.

The cam means employed in the apparatus of the present invention may be designed in a variety of configurations to provide different movements of the first and second workpiece engaging means as well as to vary the pressure generated by the workpiece engaging members of the first and second workpiece engaging means on a workpiece. Further, the workpiece engaging apparatus of the present invention may be modified, such as by simply changing the shape of the cam means, to enable its usage for other applications, such as gripping, clamping, piercing, hemming, etc.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
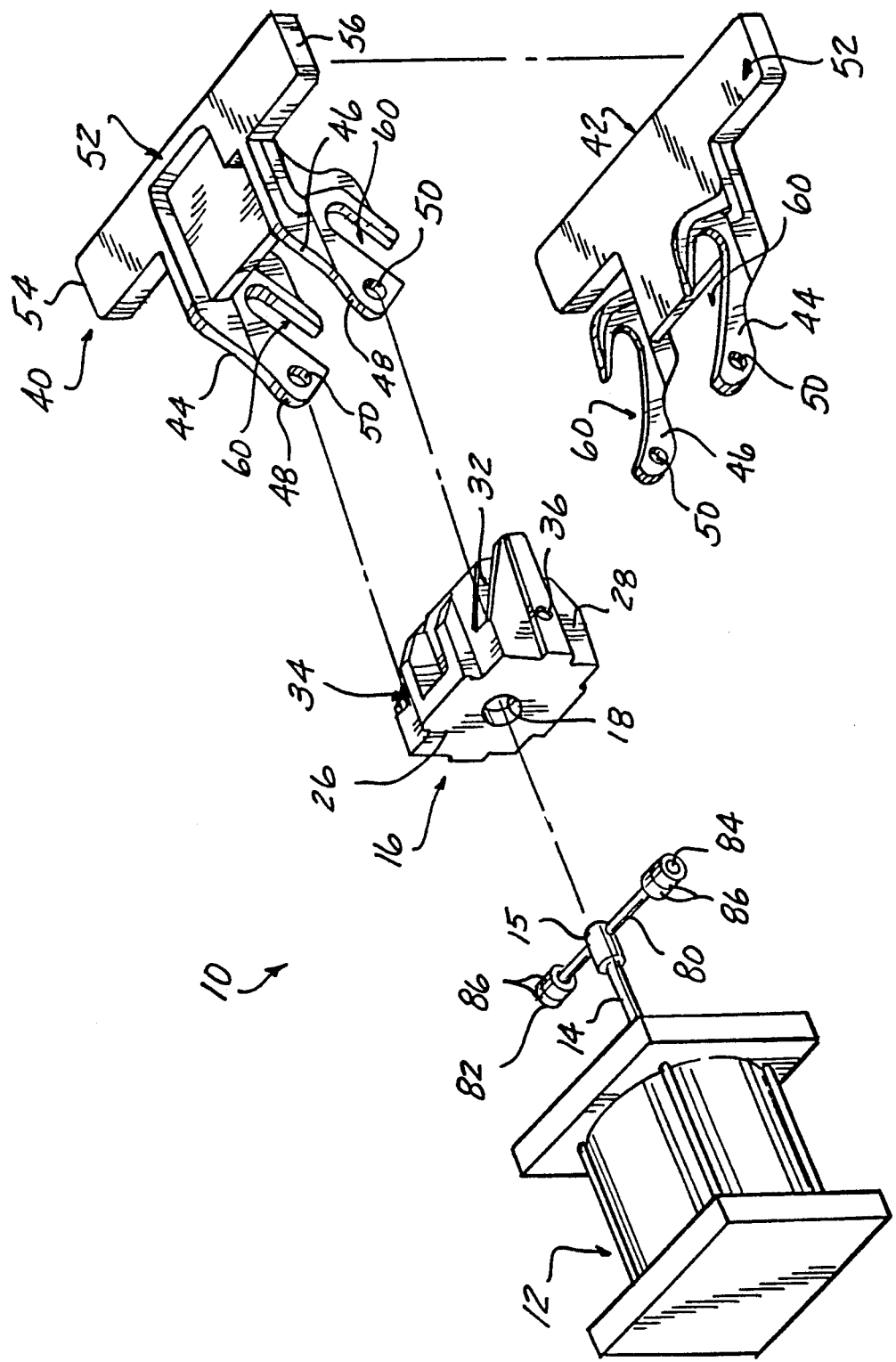
FIG. 1 is an exploded, perspective view of one embodiment of the apparatus of the present invention.

Throughout the following description and drawing, an identical reference number is used to refer to the same component shown in multiple figures of the drawing.

The present invention is an apparatus 10 for engaging workpieces. In one embodiment, the apparatus 10 is designed to act as a gripper to engage or grip a workpiece. The apparatus 10 of the present invention may also be configured for use as a clamp, piercer or hemmer, as described hereafter.

Referring now to the drawing, and to FIG. 1 in particular, the apparatus 10 includes a linear drive means 12 which has an extensible and retractable, reciprocal linear drive member 14 mounted therein. In a preferred embodiment, the linear drive means 12 comprises a fluid operated cylinder, such as a hydraulic or pneumatic cylinder. The linear drive member 14 is a cylinder rod extending outward from one end of the cylinder 12. The Cylinder rod 14 reciprocates between extended and retracted positions with respect to the cylinder 12 upon bi-directional activation of the cylinder 12 through conventional valves, not shown. An enlarged, cylindrical cap 15 is mounted on the outer end of the cylinder rod 14. The end of the cylinder rod 14 is attached to the cap 15 by suitable means, such as threads, press fit, welding, etc.

The drive means 12 also includes a support body 16 shown generally by reference number 16 in FIGS. 1, 2, 3 and 4. The support body 16 is mounted to one end of the cylinder 12 and includes a central through bore 18 through which the cylinder rod 14 reciprocates. The support body 16 includes a centrally located sleeve denoted in general by reference number 20. The through bore 18 extends longitudinally through the central sleeve 20 as shown in detail in FIG. 4. Opposed slots 22 and 24 are formed in the outer end of the central sleeve 20 and extend inward along the sides of the sleeve 20 for a predetermined distance.

The support body 16 also includes a planar mounting surface 26 which is placed in registry with one end of the cylinder 12 and secured thereto by suitable mounting means, such as fasteners, not shown. A pair of side arms 28 and 30 are mounted on the support body 16 and are disposed on opposite sides of the central sleeve 20. The side arms 28 and 30 are spaced from the peripheral side walls of the central sleeve 20 to define slots 32 and 34 between each side arm 28 and 30 and the central sleeve 20. Bores 36 are formed in each of the side arms 28 and 30 and are aligned with threaded bores 38 formed in the central sleeve 20. The bores 36 and 38 receive pivot pin connections as described hereafter.

The apparatus 10 also includes first and second workpiece engaging means 40 and 42. In the application of the apparatus 10 for use as a gripper, the first and second workpiece engaging means 40 and 42, respectively, operate as gripper means. It will be understood that other uses for the first and second workpiece engaging means 40 and 42 may also be had by slight modification to the shape of such first and second workpiece engaging means 40 and 42.

Further, since the first and second workpiece engaging means 40 and 42 in the first embodiment are identically constructed; although mounted in opposed, inverted positions as described hereafter, the following description will be directed only to one of the first and second workpiece engaging means, such as the first workpiece engaging means 40. It will be understood that the second workpiece engaging means 42 has the same construction.

As shown in FIGS. 1, 2, 3, 5 and 6, the first workpiece engaging means 40 includes first and second identical arms 44 and 46. Each of the arms 44 and 46 has a first end 48 and a second end which forms a part of the workpiece engaging member, as described hereafter. The first and second arms 44 and 46 are spaced a predetermined distance apart.

Figure 2:
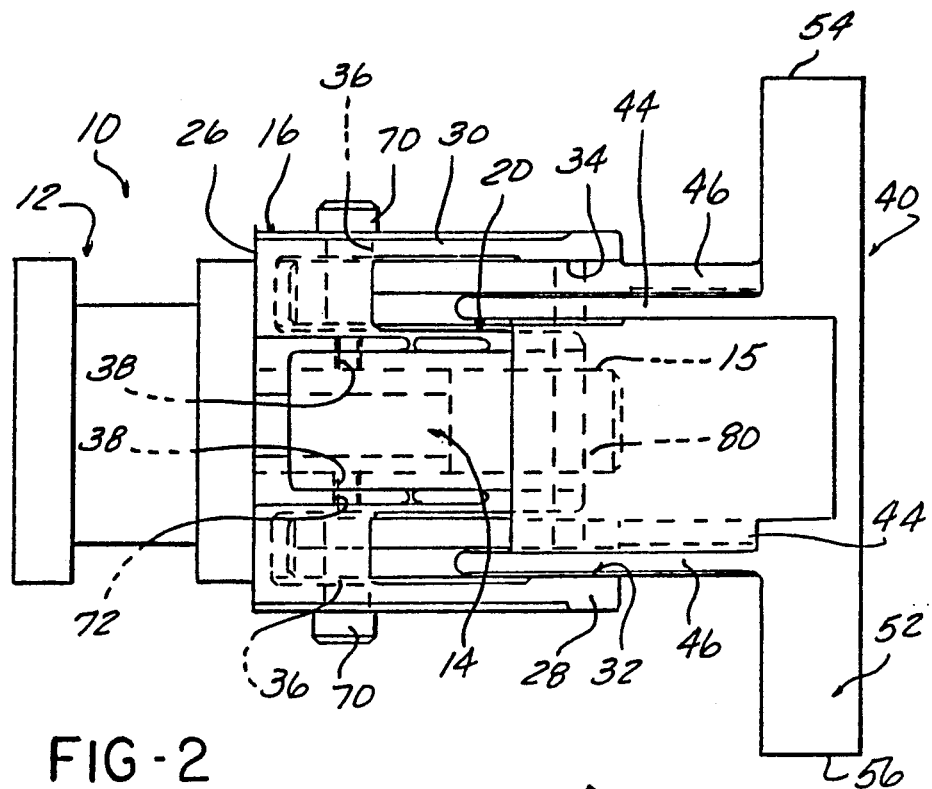
FIG. 2 is a plan elevational view of the assembled apparatus shown in FIG. 1.

Aligned bores 50 are formed in the first ends 48 of each of the arms 44 and 46. The bores 50 are alignable with the bores 36 and 38 in the support body 16, as shown in FIG. 2, when the first workpiece engaging means 40 is mounted in the support body 16.

The first workpiece engaging means 40 includes a workpiece engaging surface 52 which, in the described example of the use of the apparatus of the present invention as a gripper, comprises a planar member which acts as a gripper jaw. The planar member 52 is integrally formed with the first and second arms 44 and 46 and extends outward from the second ends of the arms 44 and 46. It will be noted that the side edges 54 and 56 of the planar member of jaw 52 extend outward different distances from the respective arms 44 and 46, the purpose of which will be described in greater detail hereafter.

Figure 3:
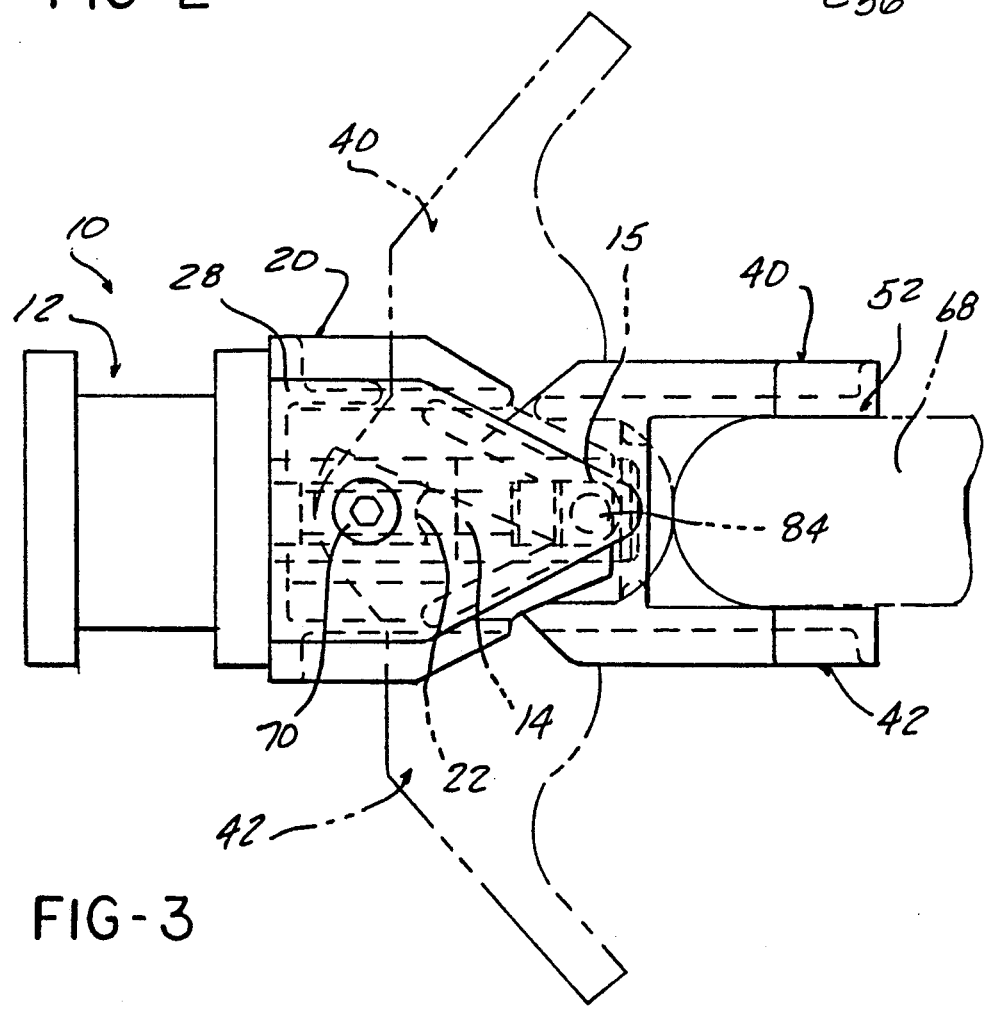
FIG. 3 is a front elevational view of the apparatus shown in FIG. 2.
Figure 5:
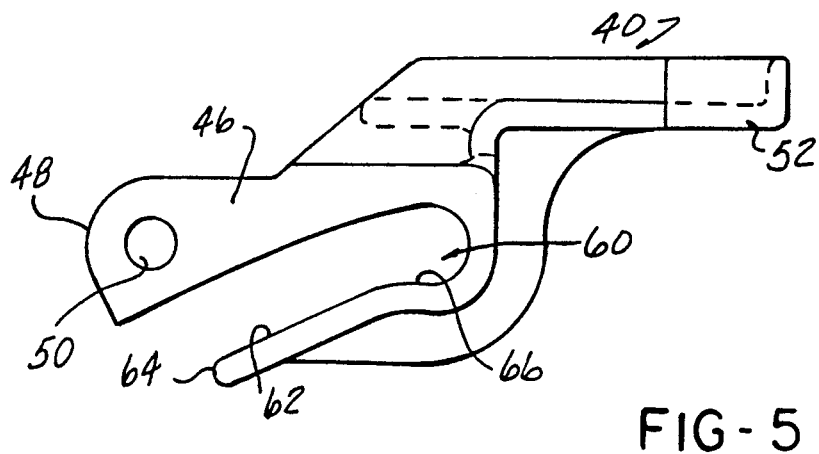
FIG. 5 is a front elevational view of one of the first and second workpiece engaging means shown in FIG. 1.
Figure 6:
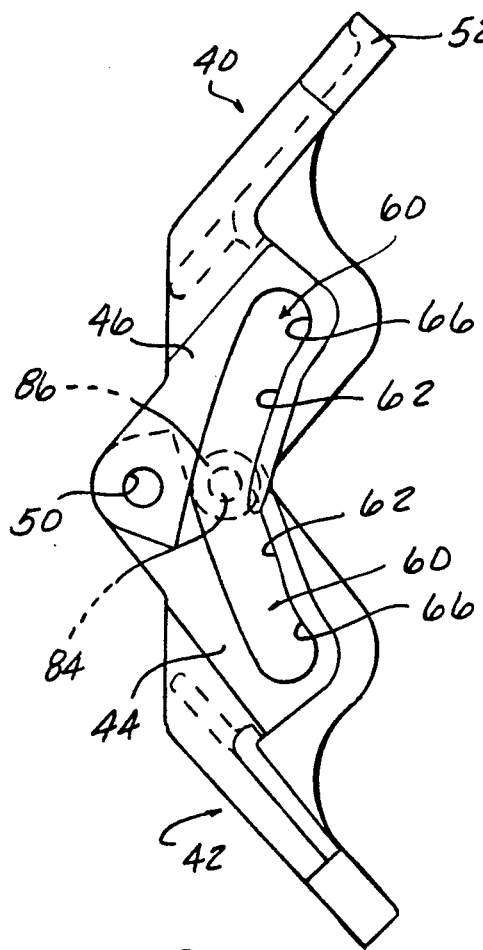
FIG. 6 is a partial, front elevational view showing the position of the workpiece engaging members of the first and second workpiece engaging means in their open position.
Figure 4:
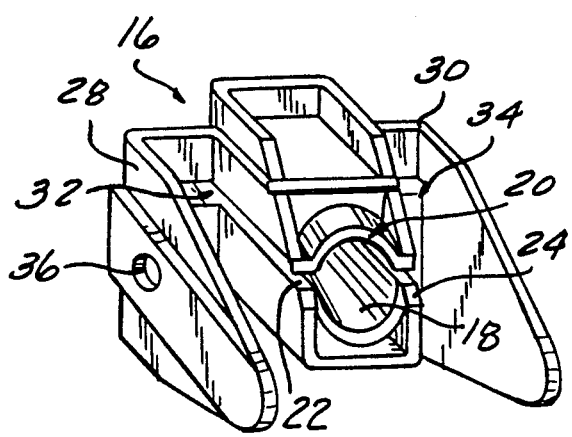
FIG. 4 is a front perspective view of the support body employed in the apparatus shown in FIG. 1.

As shown in FIGS. 1, 5 and 6, cam means are formed in each of the arms 44 and 46 of the first workpiece engaging means 40. The cam means, denoted in general by reference number 60, are identical in each of the arms 44 and 46. The cam means 60 includes a first linear portion 62 which extends from an open end 64 in the arm 44 or 46 at an inclined angle from the linear motion axis of the cylinder rod 14 when the first workpiece engaging means 40 is in the second closed position, as shown in FIG. 3. The cam means 60 also includes a second angularly inclined portion 66 which is contiguous with the first linear portion 62 and disposed at a predetermined angle with respect to the first linear portion 62.

The first and second workpiece engaging means 40 and 42 are formed of a suitable high-strength material, such as a highstrength steel. Further, the cam means 60 formed in each of the first and second workpiece engaging means 40 and 42 is hardened for durability and long life.

The first and second workpiece engaging means 40 and 42 are disposed in opposed, inverted positions, as shown in FIGS. 1, 2, 3 and 6, with the workpiece engaging surfaces 52 opposing each other and spaced apart a predetermined distance sufficient to securely engage a workpiece 68 shown in phantom in FIG. 3. The first and second workpiece engaging means 40 and 42 are slidably inserted into the slots 32 and 34 formed in the support body 16 and are positioned with the bores 50 in the first ends 48 of each of the arm 44 and 46 aligned with the bores 36 and 38 in the support body 16. Pivot pins 70 are inserted through the aligned bores 36, 38 and 50 to pivotally connect the first end 48 of each of the arms 44 and 46 of the first and second workpiece engaging means 40 and 42 to the support body 16. It should be noted that the outer end 72 of the pivot pin 70 is threaded to threadingly engage and securely retain the pivot pin 70 in the threaded apertures 38 formed in the central sleeve 20 of the support body 16.

As noted above, the outer side edges 54 and 56 of each of the workpiece engaging members 52 of the workpiece engaging means 40 and 42 extend outward different distances from the respective arms 44 and 46. In this manner, when the workpiece engaging means 40 and 42 are disposed in their opposed, inverted positions, the workpiece engaging members or surfaces 52 directly align and the arms 44 and 46 of the inverted opposed workpiece engaging means 40 and 42 are arranged in side-by-side alignment, as clearly shown in FIG. 2. That is, the arm 44 of the first workpiece engaging means 40 is disposed adjacent to the arm 46 of the second workpiece engaging means 42; while the arm 46 of the first workpiece engaging means 40 is disposed adjacent to the arm 44 of the second workpiece engaging means 42.

The apparatus 10 also includes cam follower means, shown in FIGS. 1, 2 and 3 which engages the cams 60 in the first and second workpiece engaging means 40 and 42 and causes pivotal movement of the first and second workpiece engaging means 40 and 42 from a first spaced-apart, open position shown in phantom in FIG. 3 and solid in FIG. 6 to a second, gripping or workpiece engaging position shown in solid in FIG. 3. The cam follower means comprises a cross pin 80 which is mounted in the enlarged cap 15 affixed to the end of the cylinder rod 14. The cross pin 80 has first and second ends 82 and 84 which extend outward from the cylinder rod 14 and the enlarged cap 15. Pairs of cam follower members 86 are mounted on each of the first and second ends 82 and 84 of the cross pin 80. The cam follower members 86 may comprise rollers or bushings and are adapted to engage the cams 60 in the arms 44 and 46 of each of the first and second workpiece engaging means 40 and 42.

In assembling the apparatus 10, the first and second workpiece engaging means 40 and 42 are disposed in opposed, inverted position with respect to each other and the arms 44 and 46 thereof arranged side by side and inserted into the slots 32 and 34 in the support body 16. The first ends of the arms 44 and 46 of each of the first and second workpiece engaging means 40 and 42 are pivotally connected to the support body 16 by the pivot pins 70. With the cylinder rod 14 of the drive means or fluid operated cylinder 12 in its retracted position, the cam follower members 86 on the ends of the cross pin 80 will be disposed at the open end 64 of each of the cams 60 at the beginning of the first linear portion 62 of each of the cams 60 in the arms of the first and second workpiece engaging means 40 and 42 as shown in FIG. 6. This causes the first and second workpiece engaging means 40 and 42 to be disposed in the open, spaced-apart position shown in solid in FIG. 6 and in phantom in FIG. 3.

When the drive means or cylinder 12 is activated to cause extension of the cylinder rod 14, linear movement of the cylinder rod 14 to its extended position shown in FIG. 1, causes the cam follower members 86 on the ends of the cross pin 80 to traverse the first linear portions 62 of each of the cam 60 in the first and second workpiece engaging means 40 and 42. This causes the first and second workpiece engaging means 40 and 42 to pivot from the open position shown in FIG. 6 to the closed, second position shown in FIG. 3 in which the workpiece engaging surfaces 52 of each of the first and second workpiece engaging means 40 and 42 securely engage or grip a workpiece 68 as shown in FIG. 3.

After the cam follower members 86 traverse the full length of the first linear portion 62 of each of the cams 60, the cam follower members 86 will enter the second angular portion 66 of each of the cams 60. This effectively locks the members 40 and 42 about the workpiece 68. Further, a high pressure or gripping force is exerted on the first and second workpiece engaging means 40 and 42 which securely engages the first and second workpiece engaging means 40 and 42 with the workpiece 68. This pressure can be infinite depending upon the angular position of the second angular portion 66 of the cams 60. Varying degrees of pressure may be attained by varying the shape, length or angular orientation of the second portion 66 of each of the cams 60.

For example, if the apparatus 10 is designed for a piercing operation, in which a punch is mounted on the first workpiece engaging means 40 and a button, having a centrally located bore or hole, is mounted on the second workpiece engaging means 42, lengthening of the second angular portion 66 of the cam 60 will enable the punch to drive through the workpiece 68 into the bore in the button to create an aperture in the workpiece 68.

A subsequent, reverse activation of the cylinder or drive means 12 causes a retraction of the cylinder rod 14. During the retraction of the cylinder rod 14, the cam follower members 86 on the cross pin 80 traverse along the cams 60 from right to left in the orientation shown in FIG. 5 and cause the first and second workpiece engaging means 40 and 42 to pivot to the open, spaced apart position shown in solid in FIG. 6.

Referring now to FIGS. 7, 8 and 9A-9D, there is depicted another embodiment of the workpiece engaging apparatus of the present invention. In this embodiment, the workpiece engaging apparatus 100 is designed for use in a hemming operation to bend the edge of one sheet over the edge of another sheet.

The apparatus 100 includes a linear drive means 12 having an extensible and retractable, reciprocal, linear drive member 14 mounted therein. As in the embodiment shown in FIG. 1, the linear drive means 12 comprises a fluid operated cylinder. The linear drive member 14 is a cylinder rod reciprocally mounted in the cylinder 12 and extending outward from one end of the cylinder 12. Valves, not shown, reciprocate the cylinder rod 14 between extended and retracted positions.

Figure 7:
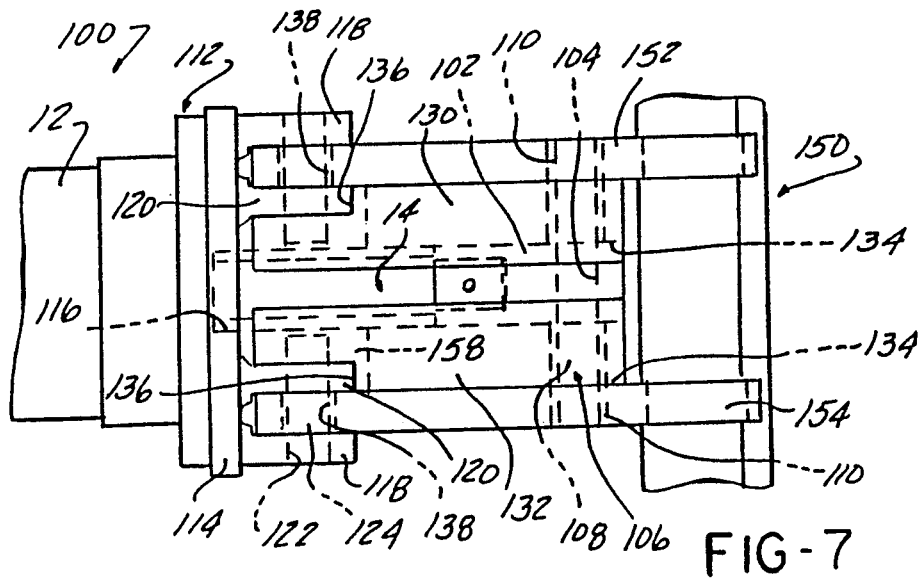
FIG. 7 is a plan elevational view of another embodiment of the apparatus of the present invention.

An enlarged cylinder rod end cap 102 is mounted to the outer end of the cylinder rod 14. The end cap 102 has a generally square cross section and extends a distance from the outer end of the cylinder rod 14, as shown in FIG. 7. The end cap 102 is attached to the cylinder rod 14 by suitable means, such as by welds, threads, set screws, etc.

A bore 104 is formed in the end cap 102 and extends transverse or substantially perpendicular to the axial length of the cylinder rod 14. Cam follower means denoted in general by reference number 106 is mounted in the bore 104 in the end cap 102. The cam follower means 106 preferably comprises a cross pin 108 which is fixedly mounted in the bore 104 and has opposed ends extending outward from the end cap 102. Pairs of bushings 110 are mounted on both outer ends of the cross pin 108.

A frame 112 is attached to the cylinder 12 for mounting the operative components of the workpiece engaging means to the cylinder 12. In a preferred embodiment, the frame 112 comprises a plate 114 which is secured by suitable means, such as welding, fasteners, etc., to the end of the cylinder 12. The plate 114 has a centrally located bore 116 through which cylinder rod 14 extends.

First and second pairs of arms, each comprising an arm 118 and an arm 120 spaced therefrom, are mounted on the plate 114 in a spaced apart arrangement as shown in FIG. 7. The arms 118 and 120 of each pair of arms are secured to the plate 114 by suitable means, such as by welding. As shown in FIG. 7, the ends of the arms 118 and 120 disposed in registry with the plate 114 have a notch portion, the purpose of which will be described in greater detail hereafter. In addition, each of the arms 118 and 120 has a through bore 122 which extends therethrough and is aligned with the corresponding bore 122 formed in the opposed arm of each pair of arms. The aligned bores 122 in each of the pairs of arms 118 and 120 receive a separate pivot pin 124.

Figure 8:
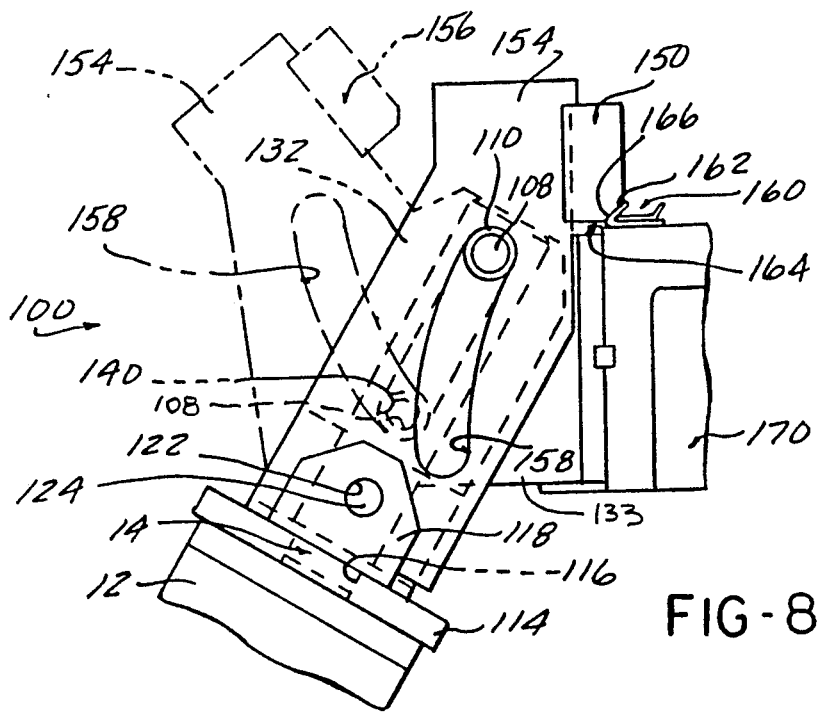
FIG. 8 is a front elevational view of the apparatus shown in FIG. 7.

The apparatus 100 also includes guide means for guiding the linear movement of the drive member 14. The guide means is preferably in the form of first and second block members 130 and 132. The block members 130 and 132 are identically constructed and have a generally rectangular cross section and an elongated, planar form with cut off or notched ends, as shown in FIG. 8. The block members 130 and 132 are fixed to a frame 170 by means of a bracket 133 which is attached to the frame 170. Each of the block members 130 and 132 is provided with a centrally located notch extending from a first end which snugly engages the sides of the cylinder rod end cap 102, as shown in FIG. 7. The opposed or second end of each of the block members 130 and 132 is notched as shown by reference number 136 so as to snugly engage the arm 120 in each pair of arms 118 and 120.

Bores 138 are formed in each of the block members 130 and 132 adjacent the second end and are alignable with the bores 122 formed in each of the arm pairs 118 and 120 so as to slidably receive the pivot pins 124 therethrough to attached the second end of each of the block members 130 and 132 to the linear drive means 12.

Each of the block guide members 130 and 132 is provided with a first cam means denoted in general by reference number 140 in FIG. 8. Preferably, the first cam means 140 has a straight, linear form between its first and second ends. The bushings mounted on the outer ends of the cross pin 108 ride in the first cam means 140 in each of the block members 130 and 132 to control the linear extension and retraction of the drive member 14. It will be understood that the first cam means 140 may have other shapes, as necessary, for a particular application.

The apparatus 100 also includes workpiece engaging means denoted in general by reference number 150. The workpiece engaging means 150 comprises first and second outer plate members 152 and 154, respectively, and a workpiece engaging member 154. The first and second outer plates 152 and 154 have a generally planar configuration with a rectangular cross section. Bores are formed in one end of each of the first and second outer plates 152 and 154 to receive the pivot pins 124 therethrough to pivotally connect the first ends of each of the first and second outer plates 152 and 154 to the frame 112 attached to the linear drive means 12.

A second cam means denoted by reference number 158 is formed in each of the first and second outer plates 152 and 154, respectively. Each of the second cam means 158 is identically constructed and, preferably, has an arcuate shape curving at a constant radius along its length, as shown in FIG. 8.

Certain of the bushings on the cross pin 108 ride in the second cam means 158 in each of the first and second outer plates 152 and 154 to control pivotal movement of the first and second plates 152 and 154 between a workpiece engaging position shown in solid in FIG. 8 and an open position shown in phantom in FIG. 8 in which the workpiece engaging member 156 is spaced from the workpiece 160. It will be understood that the second cam means 158 may have other configurations, either arcuate at different radiuses or a combination of linear sections disposed at angles with respect to each other, depending upon the particular application for which the apparatus 100 is employed.

The workpiece engaging member 156, in the embodiment shown in FIGS. 7 and 8 which is designed for use in a hemming operation, has a block-like form with a first workpiece engaging edge 162, a second, spaced workpiece engaging edge 164, a flat surface 166 extending between the first and second edges 162 and 164 and a flat bottom surface 167. The workpiece engaging member 156 is secured to the second ends of the first and second outer plates 152 and 154 by suitable means, such as by welding. It will be understood that the shape of the workpiece engaging member 156 as well as its length may be varied to suit a particular application and the shape and size of the workpieces in such applications.

In the hemming application described by way of example only, the workpiece 160 is mounted on a frame 170 typically mounted in a tool or machine. The workpiece 160 in this example comprises a lower disposed metallic sheet 172 having an outer bendable edge or flange 174. An upper sheet 176 is disposed above and in registry with the lower sheet 172, as shown in FIGS. 9A-9D.

The operation of the apparatus 100 in a hemming operation will now be described in detail. It will be assumed that the linear drive member 14 has been retracted within the cylinder 12. In this position, the cross pin 108 carried by the linear drive member 14 has moved to a position adjacent the cylinder 12. During its prior retraction, the cross pin 108 rides within the first and second cams 140 and 158 and causes the first and second outer plates 152 and 154 to pivot about the pivot pins 124 to the position shown in phantom in FIG. 8. In this position, the workpiece engaging member 156 is spaced from the workpiece 160 mounted on the frame 170. As the cylinder 12 is actuated to cause extension of the linear drive member 14, the cross pin 108 traverses the first and second cams 140 and 158 and causes the first and second outer plate members, as well as the block members 130 and 132 to pivot about their interconnected first ends about pivot pins 124. The block members 130 and 132 drive the linear drive means in a linear movement. However, the arcuate shape of the second cam means 158 causes the first and second outer plates 152 and 154 to pivot from the open position shown in phantom in FIG. 8 to the solid position shown in FIG. 8 in which the workpiece engaging member 156 is brought into gradual engagement with the workpiece 160.

Figure 9A:
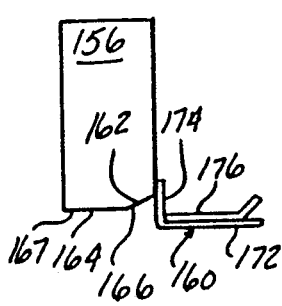
FIGS. 9A, 9B, 9C and 9D are partial, sequential representations of the use of the apparatus shown in FIGS. 7 and 8 in a hemming operation.

FIGS. 9A-9D depict the sequential movement and action of the workpiece engaging member 156 in hemming the outer edge or flange 174 of the lower sheet 172 about the edge of the upper sheet 176. As the workpiece engaging member 156 is brought into engagement with the workpiece 160 during the pivotal movement of the first and second outer plates 152 and 154, as described above, the first edge 162 will initially contact the upturned, perpendicular flange 174 of the lower sheet 172, as shown in FIG. 9A.

Figure 9B:
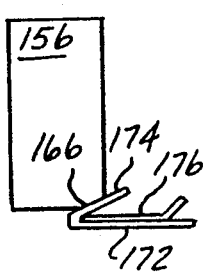
Figure 9C:
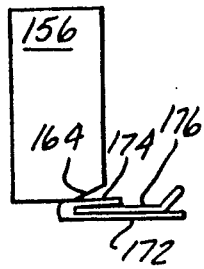

Continued pivotal movement of the first and second outer plates 152 and 154 will bring the flat surface 166 on the workpiece engaging member 156 into engagement with the flange 174 on the lower sheet 172 and cause a pivoting or bending of the flange 174 about the outer edge of the upper sheet 176, as shown in FIG. 9B. This causes the outer flange 174 to be bent to a approximate 45° with respect to the upper sheet 176. Continued pivotal movement of the first and second outer plates 152 and 154 will bring the second edge 164 on the workpiece engaging member 156 into engagement with the flange 174 of the lower sheet 172 resulting in a further bending of the flange 174 about the edge of the upper sheet 176, as shown in FIG. 9C.

Figure 9D:
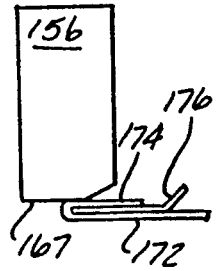
Figure 10:
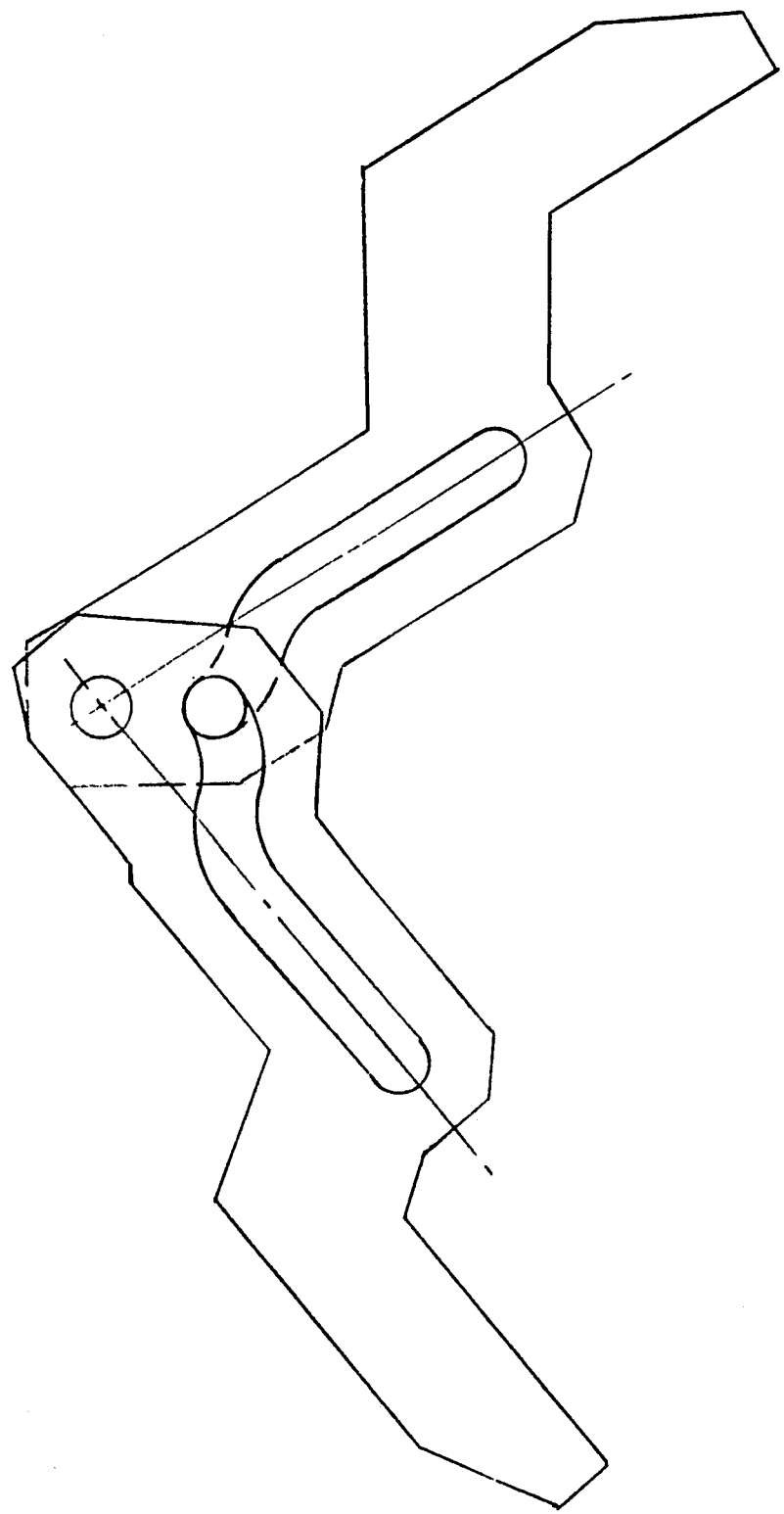
FIG. 10 is a partial, side elevational view of a prior art cam operated pierce unit.

Finally, the workpiece engaging member 156 will be pivoted into the position shown in FIG. 9D in which the lower surface 167 on the workpiece engaging member 156 engages the flange 174 on the lower sheet 172 bending the flange 174 parallel to the remainder of the lower sheet 172 and in registry with the upper sheet 176 to complete the hemming operation.

Another embodiment of the present invention is shown in FIGS. 11-19. In this embodiment, the apparatus of the present invention, depicted in general by reference number 200, is particularly devised for use as a pierce apparatus for forming one or more apertures in a workpiece, typically one or more metal sheets.

Figure 14:
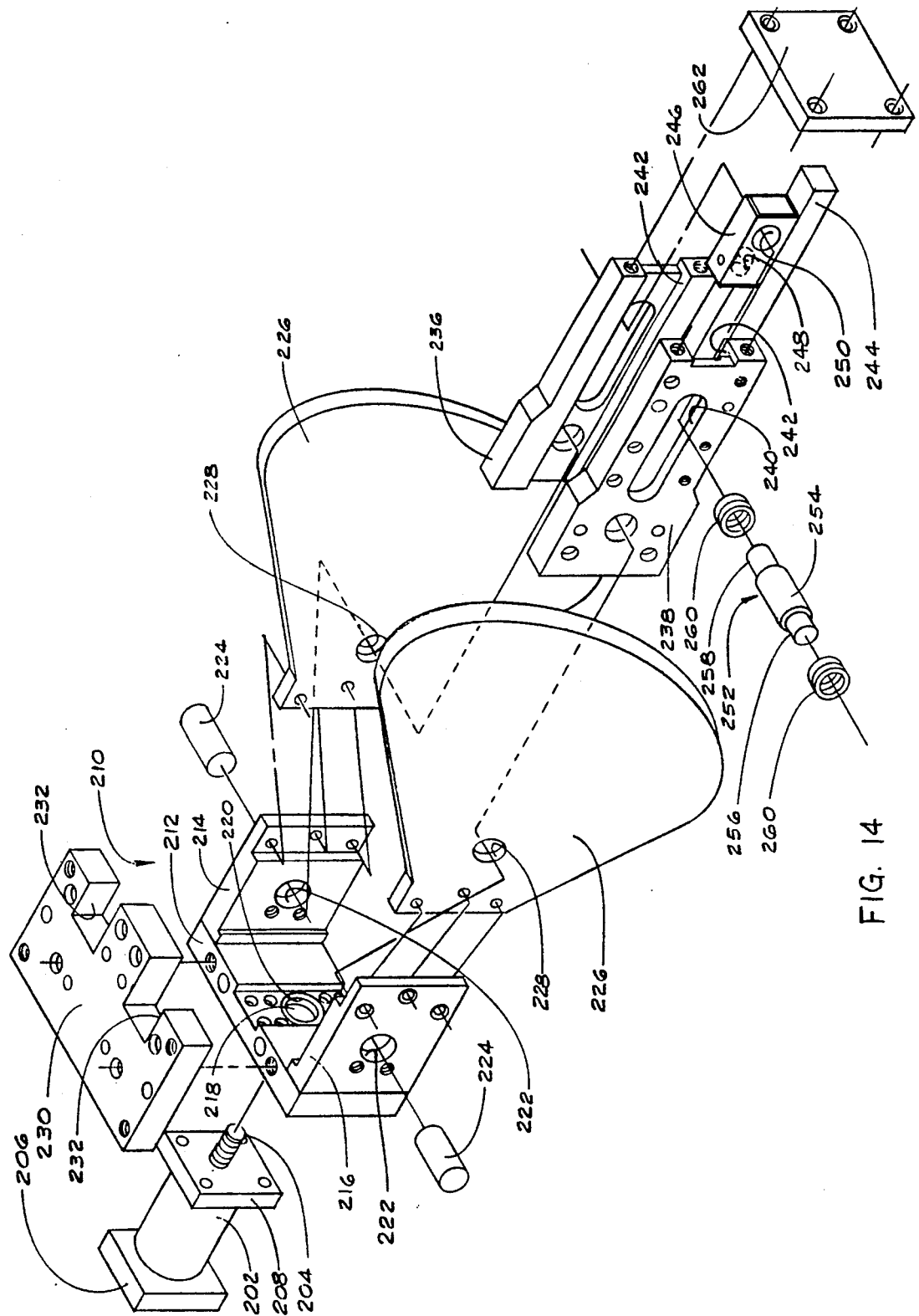
FIG. 14 is an exploded, perspective view of a portion of the pierce apparatus shown in FIG. 11.

The pierce apparatus 200 includes a linear drive means 202 having an extensible and retractable, reciprocal, linear drive member 204 mounted therein. As in the previous embodiments, the linear drive means 202 preferably comprises a fluid operated cylinder. The linear drive member 204 is a piston rod extending outward from one end of the cylinder and connected to a piston movably mounted within the cylinder. Valves, not shown, reciprocate the piston and the cylinder rod 204 between extended and retracted positions, as described hereafter. End caps 206 and 208 are mounted on opposite ends of the cylinder 202 and provide a suitable attachment to the remainder of the pierce apparatus 200. As shown in FIG. 14, the cylinder rod 204 slidably extends through the end cap 208. The end cap 208 is mounted by means of suitable fasteners to a cylinder mounting plate 210.

The cylinder mounting plate 210 has a general U-shape formed of a central wall 212 which is disposed between two side walls 214 and 216 which extend parallel to each other and away from the central wall 212. The side walls 214 and 216 are integrally joined to the central wall 212 by means of fasteners, welds, etc., not shown.

An aperture 218 is formed in the central wall 212 and slidably receives the cylinder rod 204 therethrough. A spacer ring 220 is mounted in the aperture 214 in the central wall 212 to slidably support the cylinder rod 204. Aligned apertures 222 are formed in each of the side walls 214 and 216 of the cylinder mounting plate 210 and receive pivot pins 224 therethrough.

A pair of side cover plates 226 having the enlarged, arcuate shape shown in FIG. 14, are fastened to the interior surfaces of the side walls 214 and 216 of the cylinder mounting plate 210.

A mounting plate 230 is secured by fasteners to the top surface of the cylinder mounting plate 210 as shown in FIGS. 11-14. The mounting plate 230 serves as a suitable mounting surface for attaching the pierce apparatus 200 to a suitable support, such as a programmable robot, tool, stand, etc. The mounting plate 230 includes a pair of spaced notches 232 which receive the pivotal arms therethrough, as described hereafter.

A pair of center cam plates 236 and 238 are mounted within the cylinder mounting plate 210, generally on opposite sides of the aperture 218 formed in the central wall 212 of the cylinder mounting plate 210. Each of the center cam plates 236 and 238 has a generally linear cam 240 formed therein and extending linearly between the opposite ends of each center cam plate 236 and 238. Further, the inner opposed side walls of each of the center cam plates 236 and 238 has a generally open, U-shaped notch 242. Upper and lower cam spacers 244, only one of which is shown in FIG. 14, are mounted between the upper and lower portions of each of the center cam plates 236 and 238, bounding the notch 242 formed therein. The surrounding side walls of each of the center cam plates 236 and 238 bounding each of the notches 242 forms an elongated, generally square or rectangular opening extending through the center cam plates 236 and 238 which acts as a guide means for a cylinder rod end block 246. The cylinder rod end block 246 has an internal threaded bore 248 which receives one end of the cylinder rod 204 therein. A transverse bore 250 is formed at the opposite end of the cylinder rod end block 246 for receiving a . drive pin 252 therethrough. The cylinder rod end block 246 thus reciprocates linearly within the guide means or central cam plates 236 and 238 and spacers 244 upon reciprocal, extension and retraction of the cylinder rod 204.

The drive pin 252 includes an enlarged diameter central portion 254 which is mounted within the transverse bore 250 in the cylinder rod end block 246 and which slides within the cam 240 in the center cam plates 236 and 238 to thereby guide the cylinder rod 204 in a linear path through the center cam plates 236 and 238. A cover plate 262 is mounted to the outer ends of the center cam plates 236 and 238 to close the interior bore formed therein.

First and second pairs of arms 270 and 276, respectively, are pivotally mounted at one end to the cylinder mounting plate 210 by means of the pivot pins 224. Each of the first and second pairs of arms 270 and 276 includes a bore 282 formed adjacent a first end thereof which receives a pivot pin 224 therethrough to pivotally mount each of the first and second pairs of arms 270 and 276 to the cylinder mounting plate 210. The first or upper pair of arms 270 includes a pair of identically constructed, spaced first arms 272 and 274 which are disposed immediately adjacent the outer side surfaces of the center cam plates 236 and 238. The second or lower pair of arms 276 includes identically constructed, spaced second arms 278 and 280. The second arms 278 and 280 are disposed between the first arms 272 and 274, respectively, and the side cover plates 226.

Figure 15:
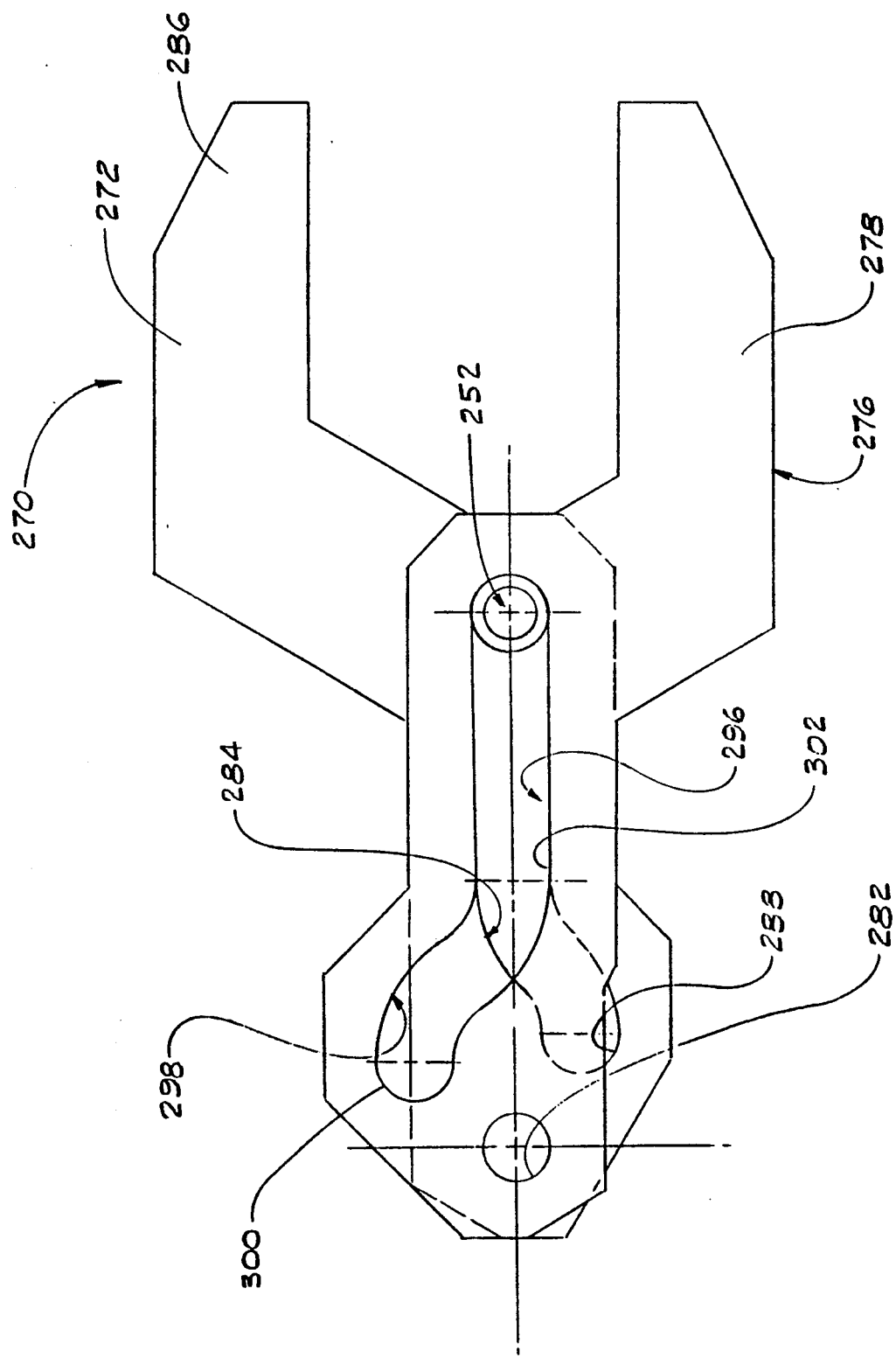
FIG. 15 is a side elevational view of the pivotal arms of the pierce apparatus shown in FIG. 11, with the arms shown in their closed position.
Figure 16:
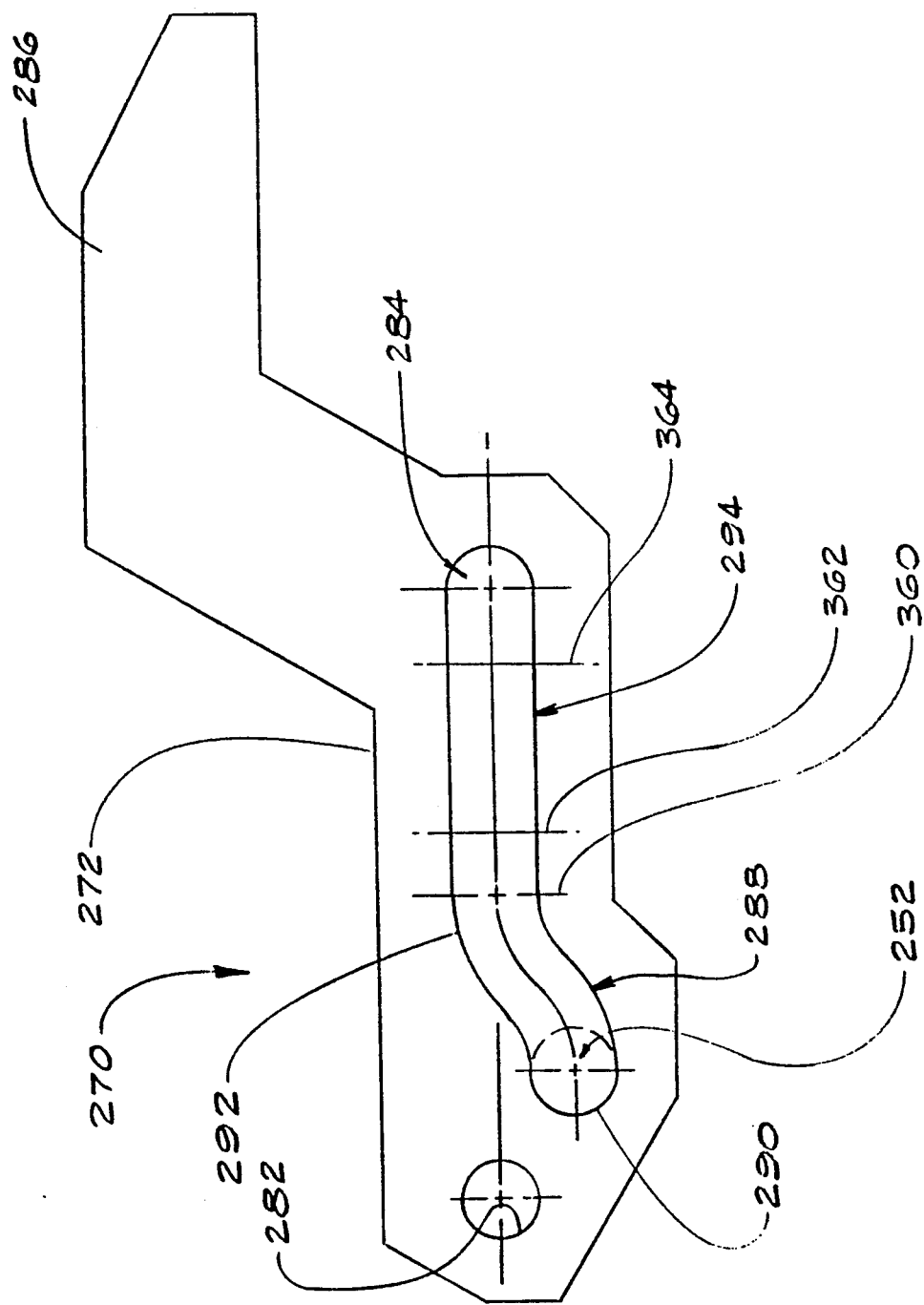
FIG. 16 is an enlarged, side elevational view of one of the first or upper pivotal arms shown in FIG. 15.
Figure 17:
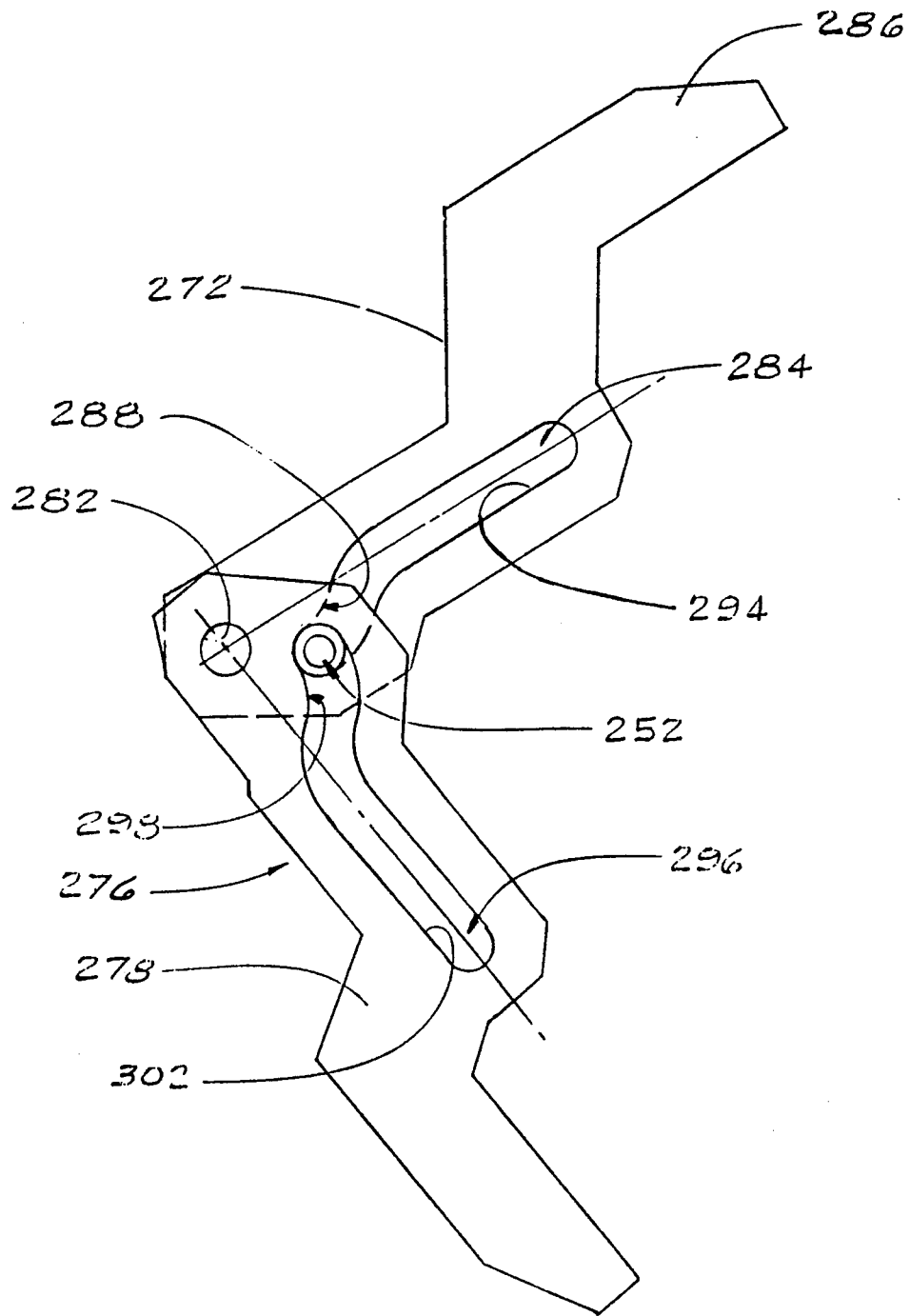
FIG. 17 is a side elevational view showing the pivotal arms in their open position.

As shown in FIGS. 15-17, each of the identical first or upper arms 270 has the bore 282 formed in a first end portion and has a cam means denoted by reference number 284 formed therein. The opposed second end portion 286 of the first arm 272 forms a pierce means support surface, as described hereafter.

As shown more clearly in FIG. 16, the cam means 284 formed in each of the first pair of arms 270, such as the first arm 272, includes a first end portion 288 having a generally curved or arcuate shape extending from a first end 290 to an opposed second end 292. The second end 292 smoothly merges with a generally linear second portion 294 of the cam means 284. The first ⓔnd portion 288 of the cam means 284 is formed so as to define a path of movement which extends along a line disposed between the first end 288 and the second end 292 at a generally obtuse angle from a line extending between the radial center of the first end 290 of the first end portion 288 of the cam means 284 and the center of the bore 282 in the first arm 272. End portions 256 and 258 extend outward from the central portion 254 of the drive pin 252. At least one and preferably a pair of bushings 260 are mounted on the end portions 256 and 258 of the drive pin 252 and slidably engage the cams 284 and 296 formed in the arms 270 and 276. This enables the drive pin 252 to be smoothly moved along the arcuate shaped first end portion 288 of the cam means 284 as the linear drive member or cylinder rod 204 extends outward from the cylinder 202.

Each of the pair of second or lower arms 276 also has a cam means 296 formed therein. The cam means 296 generally has the same shape as the cam means 284 in the first pair of arms 270, but is inverted in position with respect to the cam means 284. As shown in FIGS. 15 and 17, the cam means 296 includes a first end portion 298 having a generally arcuate shape extending smoothly from a first end 300 thereof. The arcuate shaped first end portion 298 smoothly merges with a generally linear second portion 302 which extends to the second end of the cam means 296. The arcuate shaped end portion 298 also forms a smooth path for movement of the drive pin 252 therethrough as described above.

In operation, the first and second pairs of arms 270 and 276 through their pivotal connection via the pivot pins 224 to the cylinder mounting plate 210 and the sliding engagement of the drive pin 252 connected to the end of the linear drive member or cylinder rod 204 which engages the cams 284 and 296 in the first and second pairs of arms 270 and 276 moves the first and second pairs of arms 270 and 276 between a spaced-apart, open position shown in FIG. 17 and a closed, workpiece engaging position shown in FIG. 15. During such movement, the drive pin 252 is extended by movement of the cylinder rod 204 from the first ends 290 and 300 of the cams 284 and 296, respectively, through the arcuate first end portions 288 and 298, and to the linear, second end portions 294 and 302 of the cam means 284 and 296, respectively. Retraction of the cylinder rod 204 into the cylinder 202 causes a reverse movement of the drive pin 252 from the second end, as shown in FIG. 15, of the cam means 284 and 296 to the first ends thereof, as shown in FIG. 17.

As shown in FIG. 16, the movement of the drive pin 252 from the first end of each of the cams 284 and 296 causes the simultaneous movement of the first and second pairs of arms 270 and 276 between the described open and closed positions during the travel of the drive pin 252 from the first end of each of the cams 284 and 296 to the second end portion denoted by reference number 292 of the arcuate first end of each cam. Further extension of the drive pin 252 via the linear drive member or cylinder rod 204 effects the piercing operation as described hereafter.

Figure 11:
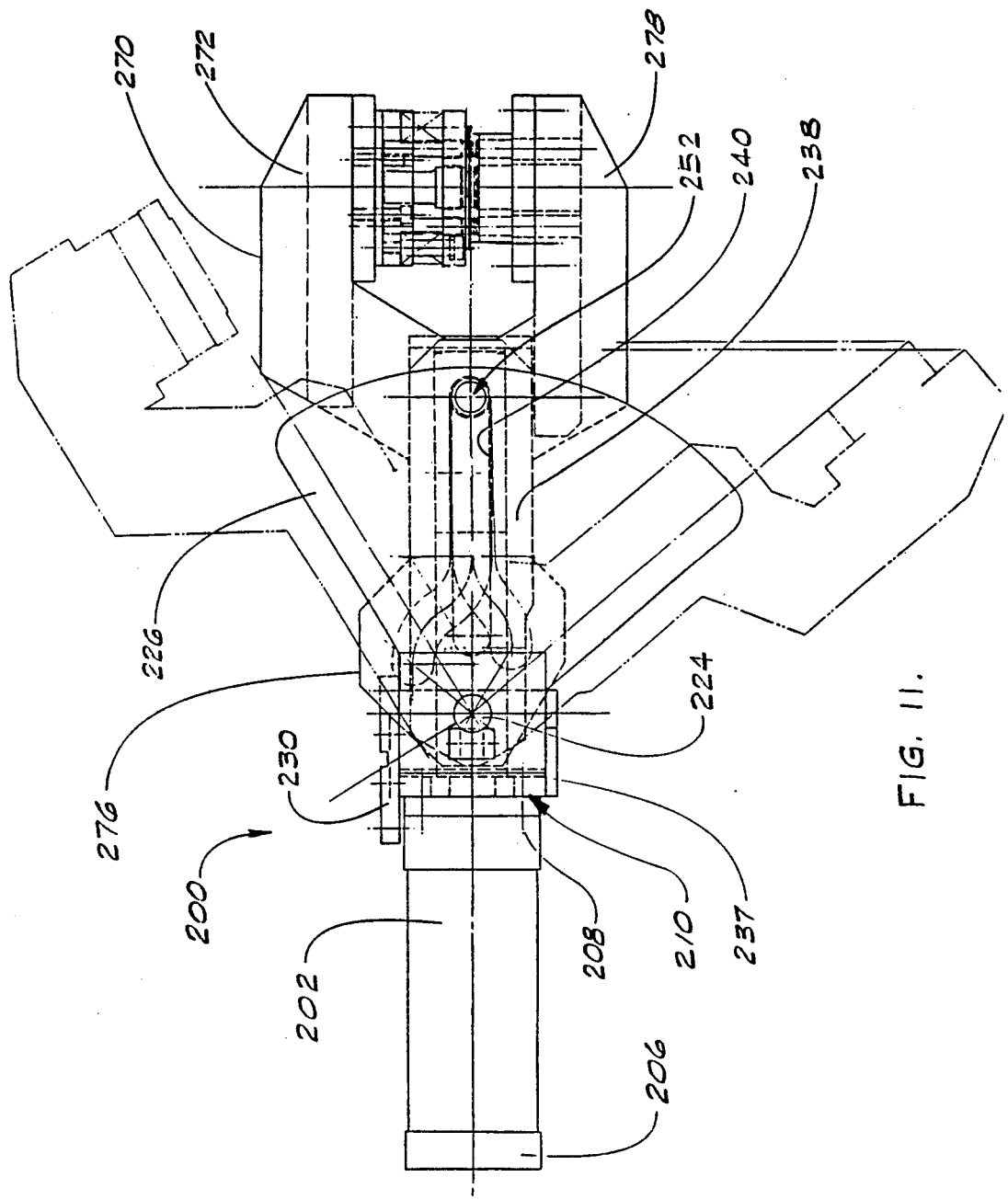
FIG. 11 is a side elevational view of a pierce apparatus constructed in accordance with the teachings of an embodiment of the present invention.
Figure 12:
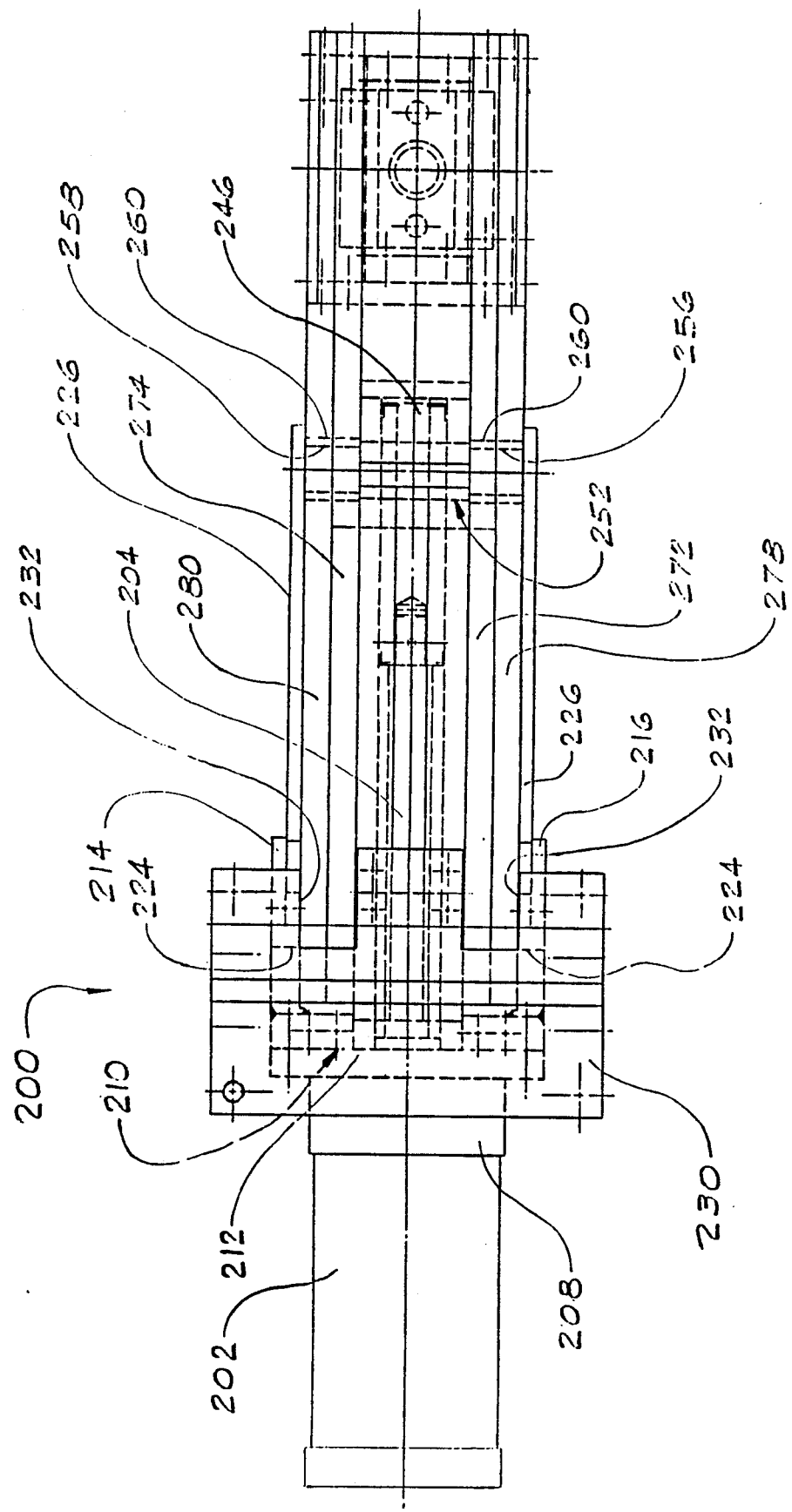
FIG. 12 is a plan view of the pierce apparatus shown in FIG. 11.
Figure 13:
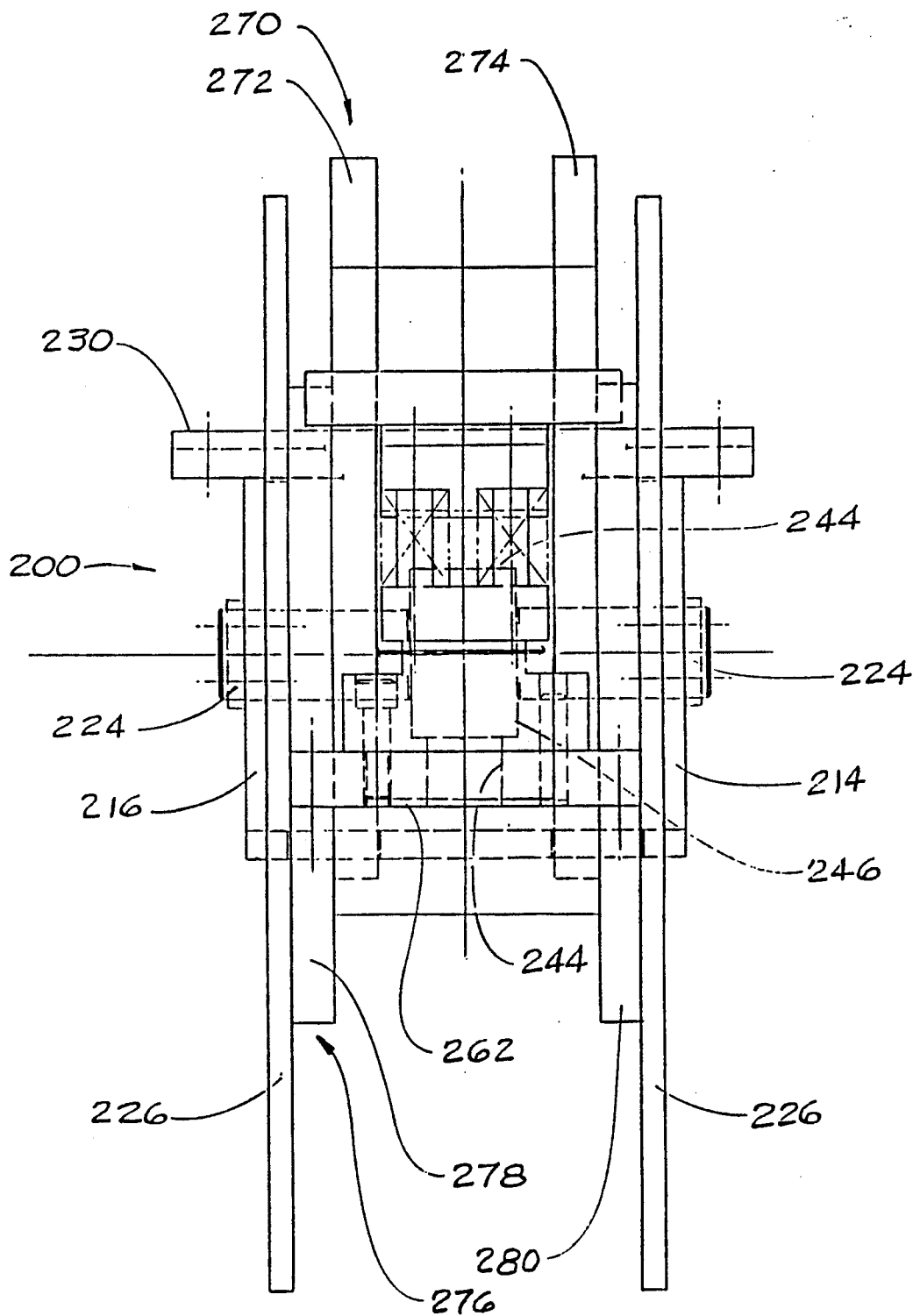
FIG. 13 is a right-hand end view of the pierce apparatus shown in FIG. 11.
Figure 18:
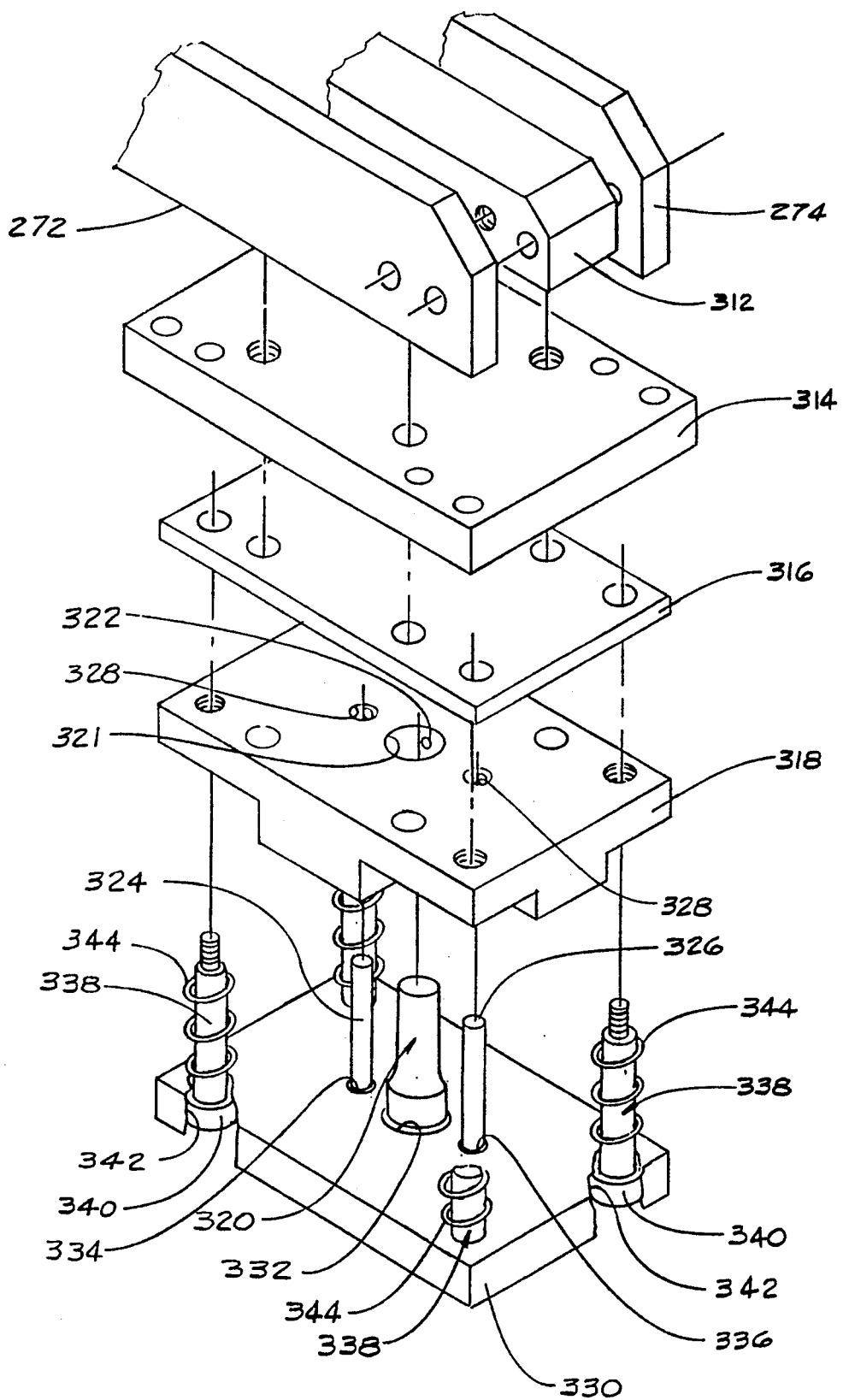
FIGS. 18 and 19 are exploded, perspective views showing the pierce and die means of the pierce apparatus shown generally in FIGS. 11-13.
Figure 19:
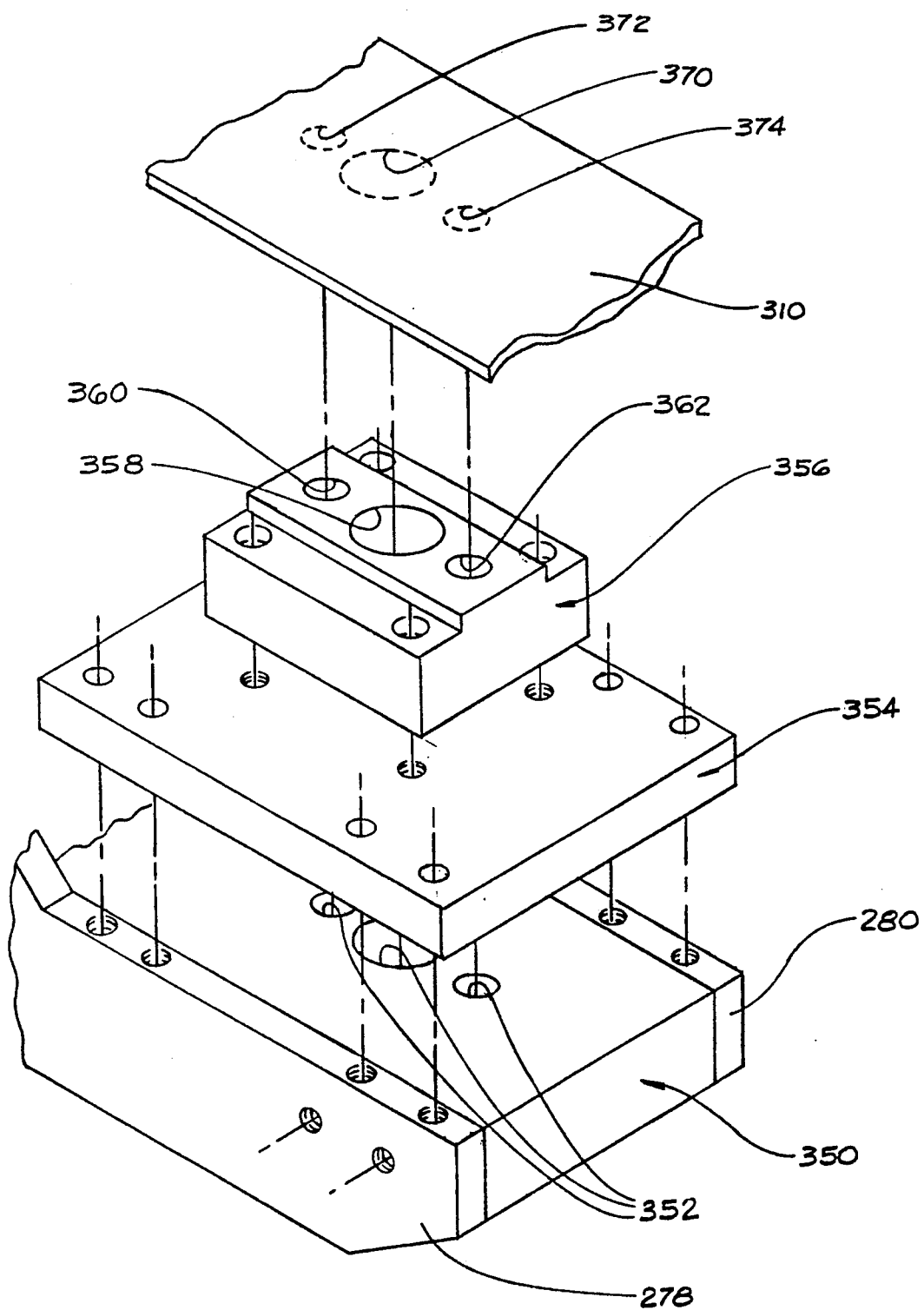

As shown, generally in FIGS. 11-13, and in greater detail in FIGS. 18 and 19, the pierce apparatus 200 includes a pierce means and a die means for forming an aperture in a workpiece, such as a thin metal sheet 310, shown in FIG. 19.

As shown in FIG. 18, an upper cam spacer 312 in the form of an elongated block-shaped member is mounted to and secured between the second ends of the first pair 270 of pivotal arms 272 and 274. A punch plate 314, having a generally rectangular configuration and formed with suitable mounting bores for receiving fasteners and dowels therethrough, is secured to the bottom surface of the second ends of the first arms 272 and 274. A backing plate 316 formed of a hardened material, such as a hardened steel, is similarly secured to the punch plate 314. The backing plate 316 distributes the forces exerted through the punch or pierce means, as described hereafter, evenly over the second ends of the first pair of pivotal arms 272 and 274.

A punch holder 318 is secured by means of suitable fasteners to the backing plate 316. The punch holder 318 is designed to fixedly support one end of a punch 320. The punch is mounted in a bore 321 formed in the punch holder 318. A conventional spring-loaded ball plunger 322 is mounted in the bore 321 in the punch holder 318 to releasably mount the punch means 320 in the bore 321.

The punch holder 318 can be designed to support any number of punches. Thus, in an exemplary embodiment, the punch holder 318 is designed to support a centrally located, large diameter punch 320 and a pair of smaller diameter punches 324 and 326, disposed on opposite sides of the centrally located punch 320. Each of the smaller diameter punches 324 and 326 is also mounted in a suitably formed bore 328 formed in the punch holder 318 and is releasably mounted thereto by means of a spring-loaded ball plunger, as shown in FIG. 18.

A stripper plate 330 is disposed adjacent to the punch holder 318. The stripper plate 330 has a generally rectangular configuration and includes a centrally located enlarged bore 332 for receiving the central punch 320 therethrough and a pair of smaller diameter bores 334 and 336 for receiving the smaller diameter punches 324 and 326, respectively, therethrough.

The stripper plate 330 is biasingly connected to the punch holder 318 by means of a plurality of stripper bolts, each denoted by reference number 338. The stripper bolts 338 are generally located at the corners of the stripper plate 330 and include an elongated, socket-type head 340 which movably seats within an enlarged recess 342 formed in the stripper plate 330. The shaft of each of the stripper bolts 338 extends upward through the stripper plate 330 and is threadingly attached to suitably formed bores formed in the corners of the punch holder 318. A biasing means 344, preferably in the form of a coil spring, is disposed about each stripper bolt 338 and is seated between the punch holder 318 and the stripper plate 330. The biasing means or springs 344 normally bias the stripper plate 330 away from the punch holder 318 so as to separate the workpiece 310 from the punches 320, 324 and 326 after a piercing operation, as described hereafter.

As shown in FIG. 19, a lower spacer 350 is disposed between and secured to the spaced second ends of the second, lower, pivotal arms 278 and 280. A plurality of bores 352, each sized to receive one of the punches 320, 324 and 326 therethrough, are formed in the spacer 350. A die mounting plate 354 is secured by means of suitable fasteners to the second arms 278 and 280 and is disposed over the second end of the arms 278 and 280 and the spacer 350. The die mounting plate 354 also includes bores, similar to the apertures 352 in the spacer 350. A die means 356 is mounted by means of suitable fasteners to the die mounting plate 354. By way of example only, the die means 356, which is formed of a suitable hardened, high strength material, includes through bores 358, 360 and 362, which slidably receive the ends of the punches 320, 324 and 326 therethrough. Each of the bores 358, 360 and 362 has a first diameter upper end, shown in FIG. 19, which closely approximates the outer diameter of each of the punches 320, 324 and 326, respectively. Each of the bores 358, 360 and 362 expands radially outward to a slightly larger diameter through the die means 356. Each of the bores 358, 360 and 362 is aligned with the corresponding bores 352 formed in the die mounting plate 354 and the spacer 350 to provide an escape path for the removal of slugs punched from the workpiece 310 by the punches 320, 324 and 326, as described hereafter.

In operation, the piercing apparatus 200 will initially be disposed with the first and second pairs of pivotal arms 270 and 276 in their open, spaced apart position, as shown in FIG. 17. The drive means or cylinder 202 will be activated to cause extension of the linear drive member or cylinder rod 204. Extension of the cylinder rod 204 moves the drive pin 252 along the cams 284 and 296 formed in the first and second pairs of arms 270 and 276 causing such arms to move to the closed position shown in FIG. 15. As the drive pin 252 moves along the cams 284 and 296, the movement of the first and second pairs of arms 270 and 276 to the closed position will be substantially effected by the time the drive pin 252 reaches the end of the first arcuate portion of each of the cams, such as the first arcuate portion 288 of the cam 284 formed in the first pair of arms 270. Further movement of the drive pin 252 from the position denoted by reference number 292 in FIG. 16 to the position denoted by reference number 362 causes the stripper plate 330 to engage the workpiece 310 and compress the biasing springs 344. Further travel of the drive pin 252 from the position denoted by reference number 362 to the position denoted by reference number 364 along the cam means 284 and the corresponding cam means 296 in the second or lower plates 276 moves the punches 320, 324 and 326 through the stripper plate 330 into engagement with and through the workpiece 310 thereby forming apertures 370, 372 and 374, respectively, in the workpiece 310 as shown in FIG. 19. The punches 320, 324 and 326 extend through the workpiece 310 into the upper portions of the bores 358, 360 and 362, respectively, in the die means 356. The slugs formed by the punches fall through the bores formed in the die means 356, the die mounting plate 354 and the lower spacer 350.

After the completion of a piercing operation, the cylinder rod 204 will be retracted thereby moving the drive pin 252 from the second end of each of the cams 284 and 296 along the second and first portions of each of the cams 284 and 296. This retracts the punches 320, 324 and 326 from the die means 356 and the workpiece 310 and partially through the stripper plate 330. Further movement of the drive pin 252 toward the first end of each of the cams 284 and 296 causes the biasing springs 344 to urge the stripper plate 330 away from the punch holder 318 thereby forcing the workpiece 310 from the punches 320, 324 and 326. Retraction of the cylinder rod 204 continues until the first and second pairs of pivotal arms 270 and 276 reach the fully open position shown in FIG. 17.

In summary, there has been disclosed a unique pierce apparatus which generate the high forces needed to pierce or punch apertures in a workpiece, such as a metal sheet, while providing smooth pivotal movement of the pierce apparatus.

What is claimed is:

1. A cam operated pierce apparatus for piercing an aperture in a workpiece, the apparatus comprising:

a linear drive means having a reciprocally extendable and retractable linear drive member movable along an axial path of movement;

guide means for guiding the linear movement of the linear drive member;

first and second pairs of oppositely movable arms, each arm of each of the first and second pairs of arms having a cam formed therein, each pair of the arms being pivotally connected at a first end to the guide means for reciprocal pivotal movement to and away from the opposed pair of arms;

the cams in the first pair of arms being identically formed to each other, the cams in the second pair of arms being identically formed to each other and to the cams in the first pair of arms and disposed in an inverted position with respect to the cams in the first pair of arms;

cam follower means, mounted on the linear drive member and engaging the cams in the first and second pairs of arms, for pivoting the first and second arms between a spaced-apart position and a closed, workpiece engaging position as the linear drive member reciprocates;

each cam having an arcuate-shaped first end portion with opposite ends which smoothly merges with a second, substantially linear second end portion, the first end portion of each cam extending along a line between the opposite ends thereof disposed at an obtuse angle from a line extending between a radial center of an end of the first end portion of each cam, the axial path of movement of the linear drive means, and a center of the pivot connection at the first end of each pair of arms to the guide means when the first and second arms are disposed in a spaced-apart position;

pierce means, mounted on a second end of the first pair of arms, for piercing aperture in a workpiece; and die means, mounted on a second end of the second pair of arms and having a bore formed therethrough for receiving the pierce means.

2. The apparatus of claim 1 wherein the cam follower means comprises:

a pin mounted on and extending laterally outward from the linear drive member.

3. The apparatus of claim 1 wherein the guide means comprises:

a mounting bracket connected to the linear drive means and extending outward therefrom, the bracket including a pair of spaced side walls, each having a linear cam formed therein;

the linear drive member engaging the linear cam in the side walls of the mounting bracket.

4. The apparatus of claim 1 wherein the pierce means comprises:

a backing plate mounted to the second ends of the first pair of arms;

a punch holder mounted to the backing plate and having at least one punch mounted in and extending therefrom;

a stripper plate disposed adjacent to the punch holder and having a bore therein through which the punch movably extends;

means for movably mounting the stripper plate to the punch holder; and biasing means, extending between the stripper plate and the punch holder, for normally biasing the stripper plate away from the punch holder.

* * * * *